United States Patent [19]

Galer

[11] 4,180,176

[45] Dec. 25, 1979

[54] GRAVITY DUMP SHIPPING CRATE FOR POULTRY

[75] Inventor: Herbert W. Galer, Newnan, Ga.

[73] Assignee: United States Steel Corporation, Pittsburgh, Pa.

[21] Appl. No.: 959,280

[22] Filed: Nov. 9, 1978

[51] Int. Cl.$^2$ ............................................. B65D 43/16
[52] U.S. Cl. ...................................... 217/57; 119/19; 220/324
[58] Field of Search ............... 220/4 B, 324, 326, 334; 217/57; 119/19

[56] References Cited

U.S. PATENT DOCUMENTS

| | | | |
|---|---|---|---|
| 3,330,434 | 7/1967 | Bromley | 220/4 B |
| 3,632,007 | 1/1972 | Kantor | 217/57 |
| 3,966,084 | 6/1976 | Box | 220/326 |
| 3,993,026 | 11/1976 | Shreckhise | 119/19 |

Primary Examiner—George T. Hall
Attorney, Agent, or Firm—William L. Krayer

[57] ABSTRACT

A gravity-operated latch permits a secure closure for a cover on a loaded poultry shipping crate. The latch flips open, permitting the cover to open, in a sequence coinciding with the sequence of efficient orientation of the crate as the crate is turned and dumped. At the conclusion of the full 360° dumping operation, the latch is unlocked and the crate is ready for loading.

4 Claims, 5 Drawing Figures

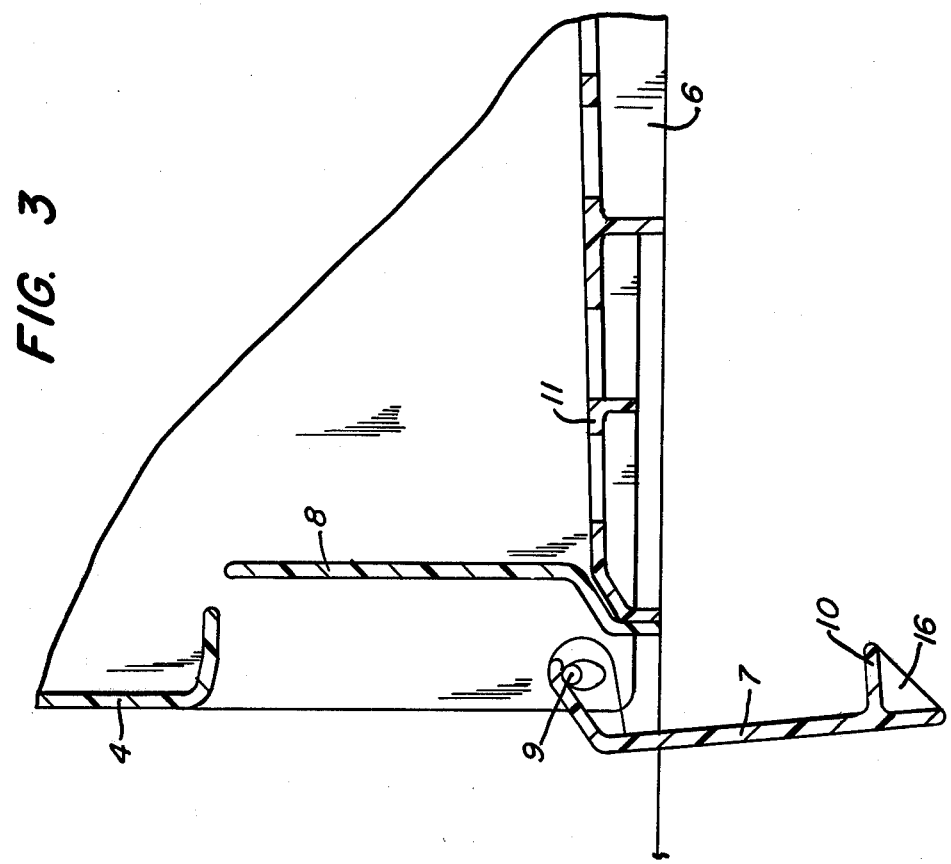
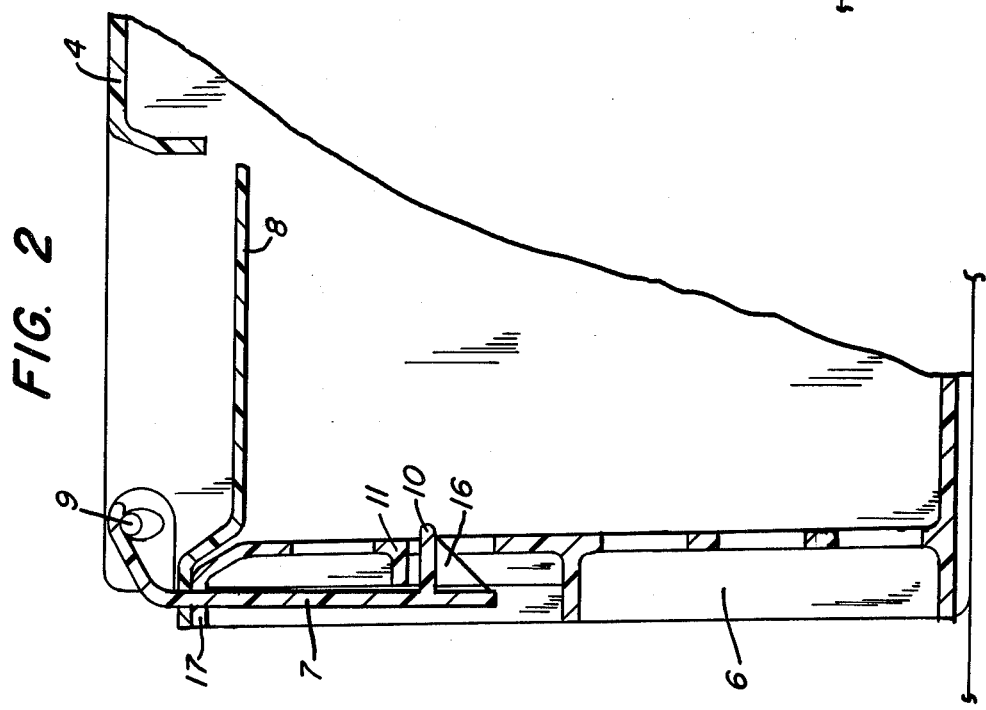

GRAVITY DUMP SHIPPING CRATE FOR POULTRY

BACKGROUND OF THE INVENTION

The growth of the poultry industry in recent years has led to the development of numerous improvements in the handling and transporting of large numbers of live poultry. Such improvements include notably the development of injection molded plastic shipping crates or coops. The molded crates have been found to be less expensive, more durable, stronger, and more amenable to stacking than other shipping crates of more conventional materials and design. Poultry crates are notoriously abused by the vagarious inflictions of the road and the elements when carried on flat-bed trucks and by human handlers at the loading and unloading sites. It is important that they remain stacked when stacked and latched when latched, but that they be easily unstacked and dumped as required. The latches in particular should be designed to minimize the damgage of rough treatment.

As an example of a prior art molded plastic poultry container, the reader may be interested in Bromley's U.S. Pat. No. 3,330,434. This design includes a nesting configuration and a latch and door opening which must be operated manually and independently.

Shreckhise's U.S. Pat. No. 3,993,026 describes a "self-dumping" door in addition to a loading door and employing a spring-loaded latching means. Having a number of moving parts, the latch is susceptible to various types of failures. Box, in U.S. Pat. No. 3,966,084, recognizes the problem inherent in prior art latches, and provides a sliding configuration which, however, can be opened accidentally.

SUMMARY OF THE INVENTION

My invention overcomes many of the problems of prior poultry shipping crates in that it provides a latch which employs no springs or moving parts other than the latch itself, is simple and easily operable, and whose action in opening the door of the crate is coordinated with the natural flow of the movements by which the poultry are dumped.

It will be explained in further detail with reference to the accompanying drawings, in which:

FIG. 2 is a section of the latch portion when the crate is in "normal" position, i.e. the cover is on top and the latch is latched.

FIG. 3 shows the same section as in FIG. 2 when the crate has been turned 90° in a counterclockwise direction.

Figure 1:
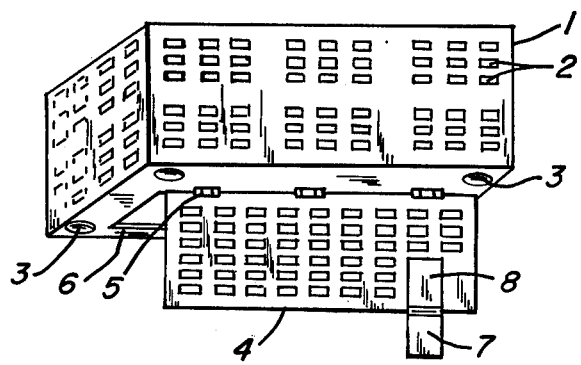
FIG. 1 is a perspective view of the complete crate, from an angle showing the cover of the crate when it is in the dumping position, i.e. inverted and freely hanging.

Referring now to FIG. 1, crate 1 is preferably a plastic, i.e. polyethylene injection molded crate having a plurality of air holes 2, and being generally rectangular in shape. It may have sockets 3 on the under side and complementary projections (not shown) on the upper side as are known in the art (illustratively in U.S. Pat. Nos. 3,966,084 and 3,330,434) so that stacks of the crates will be relatively stable. Cover 4 is mounted on hinges 5. The area which it covers terminates close to the side 6 of the crate farthest from the hinges so that latch 7, when in the latching position to be illustrated in FIG. 2, can be suspended over the side 6. Latch 7 is mounted on a pin in a manner illustrated in FIGS. 2-5 so that it is freely swingable through 270°. Indentation 8 in the cover 4 is designed to accommodate the covered but unlatched position of FIG. 5 without protruding over the general surface level of the cover 4.

In FIG. 2, a sectional view is shown of the latch portion of the invention. Latch 7 is in the latched position. That is, the crate side 6 represents the "front" of the crate, and the cover 4 containing indentation 8 is on the top of the crate. The latch 7 has been pivoted on pivot 9 so that its latching projection 10 is close to the latching surface 11 of side 6. Persons skilled in the art will recognize that the center of gravity of latch 7 is, in this view, to the left of pivot 9 and therefore latch 7 rests against side 6, so that no springs or other moving or mechanical devices need be utilized to effect a secure closure of cover 8. Pivot 9 is of course mounted on cover 8 as may perhaps be better understood by reference to FIG. 1.

In FIG. 3, crate 1 has rotated counterclockwise 90° as occurs at the beginning of a dump. The operator does not need to do anything with latch 8; it simply swings open (in a clockwise direction) by gravity when the crate is turned counterclockwise.

Figure 4:
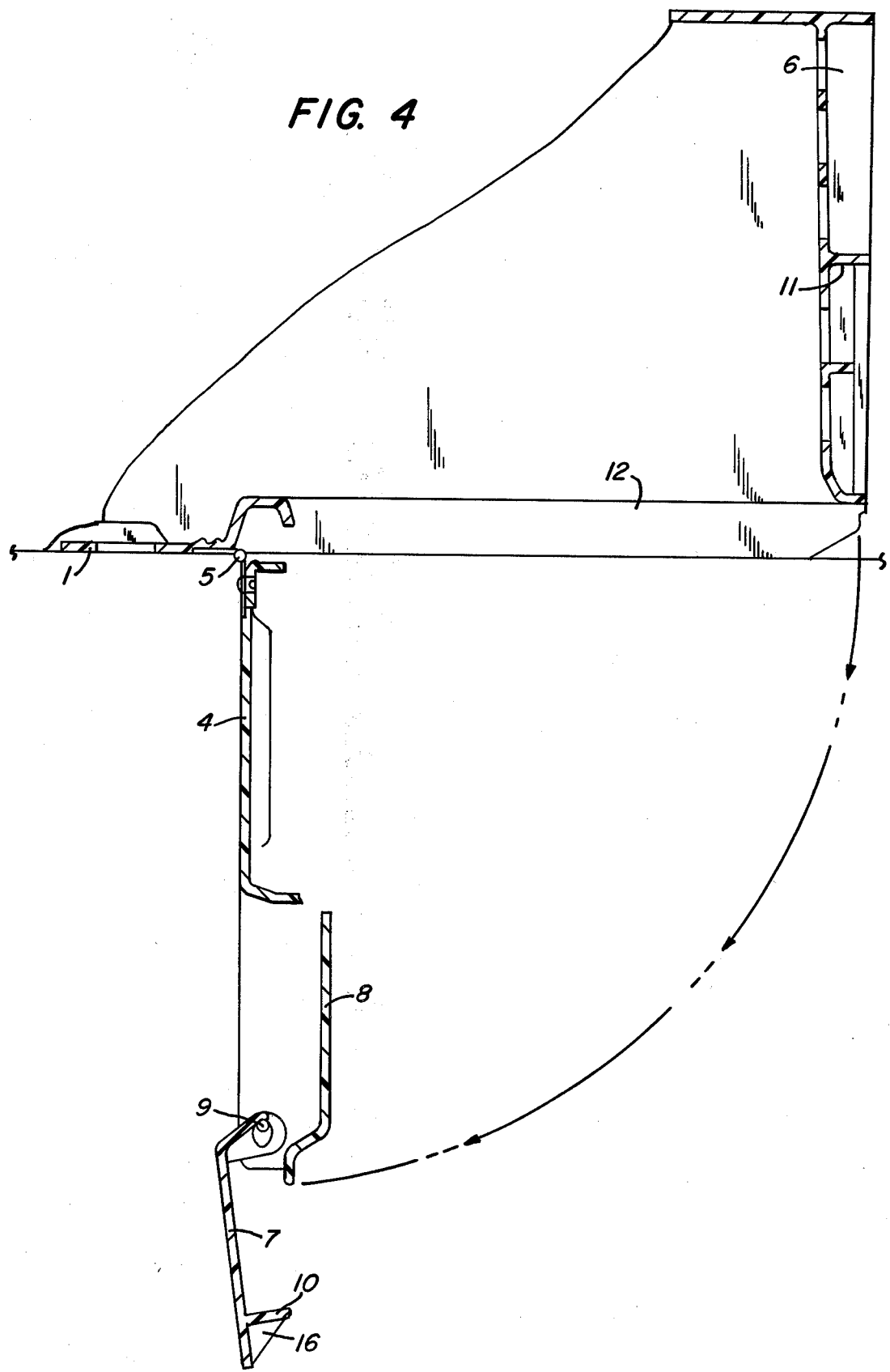
FIG. 4 shows the same section rotated to 180° from FIG. 2, with the door now hanging open.

Referring to FIG. 4, on turning the crate another 90° to completely invert it, the cover 4, which had no restraints other than the latch 7, hangs freely downward, leaving a large area 12 open, through which the poultry fall. Latch 7 of course also hangs freely from cover 4, still swinging on pivot 9.

Figure 5:
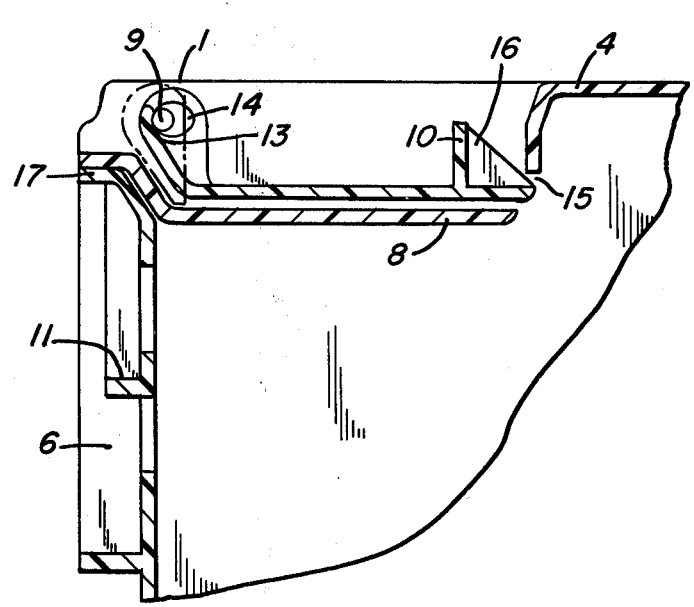
FIG. 5 illustrates the same sectioned portion after the coop has followed a full 360° cycle.

Referring to FIG. 5 now, crate 1 has been rotated completely to the original position of FIG. 2; however, while cover 4 is in the same position of FIG. 2, latch 7 is now resting in indentation 8. The pivot surface 13 through which pivot 9 operates is inclined and the pivot hole 14 somewhat elongated so that the latch 7 will slide in a direction away from side 6 and protrude slightly into slot 15, thus assuring that, when the cover 4 is lifted for loading, latch 7 will not flip open. When the operator loads the crate, he simply flips the latch from the position of FIG. 5 to that of FIG. 2, and the cover is secure. Persons skilled in the art will recognize that if latch 7 is not in the resting or open position on indentation 8 of the cover as the cover descends during rotation of the crate, but rather is in a free-swinging or vertical position, cam surface 16 on latch 7 will strike the corner 17 of the crate, swinging latch 7 to the outside while cover 4 descends. Pivot 9, combined with the action of the center of gravity of latch 7, will then urge the latch into the position of FIG. 2.

My invention is not restricted to the above particular illustrations and examples. It may be otherwise embodied and practiced within the scope of the following claims:

I claim:

1. A readily dumped shipping crate comprising a container, a hinged cover therefor, and a latching panel on said hinged cover, said latching panel being pivotally mounted on the edge of the cover opposite the hinges thereof so that, in the open position it lies on said cover at least partially under a restraining means, and in the latched position it is suspended from its pivot in a position perpendicular to said cover.

2. The crate of claim 1 wherein the latch in the open position rests in an indentation in the cover so its upper surface is no higher than the surface of the cover.

3. The crate of claim 1 wherein the latch includes a latching projection which, in the latching position is inhibited in upward movement by a latching surface on the crate.

4. The crate of claim 1 wherein the pivotal mounting of the latch includes an eccentric pivot surface to urge the latch into a restrained position with respect to a restraining means on the cover.

* * * * *